(12) United States Patent
Jeon

(10) Patent No.: US 12,423,184 B2
(45) Date of Patent: Sep. 23, 2025

(54) STORAGE SYSTEM AND OPERATING METHOD THEREOF

(71) Applicant: SK hynix Inc., Gyeonggi-do (KR)

(72) Inventor: Yong Tae Jeon, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 17/483,179

(22) Filed: Sep. 23, 2021

(65) Prior Publication Data
US 2022/0318091 A1    Oct. 6, 2022

(30) Foreign Application Priority Data
Apr. 6, 2021    (KR) .................. 10-2021-0044873

(51) Int. Cl.
*G06F 11/10*        (2006.01)
*G06F 11/20*        (2006.01)
*G06F 13/16*        (2006.01)

(52) U.S. Cl.
CPC ...... *G06F 11/1076* (2013.01); *G06F 11/2087* (2013.01); *G06F 13/1605* (2013.01); *G06F 13/1668* (2013.01); *G06F 2213/0024* (2013.01); *G06F 2213/0026* (2013.01)

(58) Field of Classification Search
CPC ............. G06F 11/1008; G06F 11/1076; G06F 11/108; G06F 11/2053; G06F 11/2056; G06F 11/2071; G06F 11/2087; G06F 11/2089; G06F 11/2094; G06F 13/14;
(Continued)

(56) References Cited

U.S. PATENT DOCUMENTS

| 8,301,835 | B2 | 10/2012 | Kim |
| 9,535,740 | B1 | 1/2017 | Graham et al. |
| 10,097,636 | B1 | 10/2018 | Maroney |

(Continued)

FOREIGN PATENT DOCUMENTS

| CN | 104965677 A | 10/2015 |
| CN | 107220196 A | 9/2017 |

(Continued)

OTHER PUBLICATIONS

Office Action for the Korean Patent Application No. 10-2021-0044873 issued by the Korean Intellectual Property Office on Apr. 20, 2023.

(Continued)

*Primary Examiner* — Elias Mamo
(74) *Attorney, Agent, or Firm* — IP & T GROUP LLP

(57) ABSTRACT

A storage system is provided. The storage system includes a master storage device configured to store data based on a RAID level determined by a host, a slave storage device configured to store the data according to a command distributed from the master storage device, and a controller hub configured to couple the slave storage device to the master storage device, wherein the master storage device is further configured to transfer the command to the slave storage device through the controller hub when the master storage device receives a command processing request from the host, and transmit a complete queue (CQ) to the host when operations of the master storage device and the slave storage device are completed in response to the command processing request.

22 Claims, 11 Drawing Sheets

(58) Field of Classification Search
CPC .. G06F 13/16; G06F 13/1605; G06F 13/1668;
G06F 2213/0024; G06F 2213/0025
USPC ............ 710/74; 711/103, 114; 714/6.2, 6.22,
714/6.23, 6.24
See application file for complete search history.

(56) References Cited

U.S. PATENT DOCUMENTS

| | | | |
|---|---|---|---|
| 10,162,793 | B1 | 12/2018 | Bshara et al. |
| 11,175,984 | B1 * | 11/2021 | Lercari ............... G06F 11/0784 |
| 2004/0123002 | A1 | 6/2004 | Bennett et al. |
| 2006/0224851 | A1 | 10/2006 | Tamura et al. |
| 2008/0034147 | A1 | 2/2008 | Stubbs et al. |
| 2011/0179219 | A1 | 7/2011 | Ma et al. |
| 2012/0271998 | A1 * | 10/2012 | Galloway ........... G06F 11/1076 711/114 |
| 2013/0246726 | A1 | 9/2013 | Kirstenpfad et al. |
| 2014/0281169 | A1 | 9/2014 | Mehrotra et al. |
| 2015/0301749 | A1 * | 10/2015 | Seo ....................... G06F 3/0619 714/6.24 |
| 2016/0110111 | A1 | 4/2016 | Song et al. |
| 2017/0337069 | A1 | 11/2017 | Huang et al. |
| 2018/0074757 | A1 | 3/2018 | Yamaguchi et al. |
| 2018/0101450 | A1 * | 4/2018 | Park ..................... G06F 13/4282 |
| 2018/0300265 | A1 | 10/2018 | Roberts et al. |
| 2019/0034306 | A1 * | 1/2019 | Wysocki ............. G06F 11/2094 |
| 2020/0004429 | A1 | 1/2020 | Schmisseur et al. |
| 2020/0073840 | A1 | 3/2020 | Mekad et al. |
| 2020/0081650 | A1 | 3/2020 | Herrell et al. |
| 2020/0133777 | A1 | 4/2020 | Lesartre et al. |
| 2021/0042255 | A1 | 2/2021 | Colenbrander |
| 2021/0216388 | A1 | 7/2021 | Kumar et al. |

FOREIGN PATENT DOCUMENTS

| | | | |
|---|---|---|---|
| CN | 108255410 A | | 7/2018 |
| JP | 2011-141842 A | | 7/2011 |
| JP | 2012-128782 A | | 7/2012 |
| KR | 20100107281 A | * | 10/2010 ............. G06F 13/10 |
| KR | 10-2014-0067404 A | | 6/2014 |
| KR | 1020150067583 A | | 6/2015 |
| KR | 10-2015-0121502 A | | 10/2015 |
| KR | 1020170027922 A | | 3/2017 |
| KR | 1020180022515 A | | 3/2018 |
| KR | 10-2018-0038813 A | | 4/2018 |
| KR | 101930117 B1 | | 12/2018 |
| KR | 1020190061473 A | | 6/2019 |
| KR | 10-2020-0017363 A | | 2/2020 |
| TW | 201643735 A | | 12/2016 |

OTHER PUBLICATIONS

Jingfeng Guo et al., I/O Virtualization Design of FCOE Adapter, 2015 International Conference on Network and Information Systems for Computers, Wuhan, China, 2015, pp. 18-21, doi: 10.1109/ICNISC.2015.78. (Year: 2015).
Notice of Allowance for the U.S. Appl. No. 17/574,266 issued by the USPTO on Feb. 15, 2023.
Notice of Allowance for the Korean Patent Application No. 10-2021-0048090 issued by the Korean Patent Office on Mar. 28, 2023.
Notice of Allowance for the Korean Patent Application No. 10-2021-0044873 issued by the Korean Patent Office on Jul. 6, 2023.
Office Action for the U.S. Appl. No. 17/481,503 issued by the USPTO on Aug. 23, 2023.
Office Action for the U.S. Appl. No. 18/316,241 issued by the USPTO on Dec. 14, 2023.
Office Action for the U.S. Appl. No. 18/316,241 issued by the USPTO on May 8, 2024.
Notice of Allowance for U.S. Appl. No. 18/316,241 issued by the USPTO on Sep. 17, 2024.
Office Action for Taiwanese Patent Application No. 111102929 issued by the Taiwanese Patent Office on Feb. 18, 2025.
Office Action for Taiwanese Patent Application No. 111106199 issued by the Taiwanese Patent Office on Jul. 29, 2025.

* cited by examiner

STORAGE SYSTEM AND OPERATING METHOD THEREOF

CROSS-REFERENCE TO RELATED APPLICATION

The present application claims priority under 35 U.S.C. § 119(a) to Korean patent application number 10-2021-0044873, filed on Apr. 6, 2021, and which is incorporated herein by reference in its entirety.

BACKGROUND

Field of Invention

Various embodiments of the present disclosure generally relate to an electronic device, and more particularly, to a storage system and an operating method thereof.

Description of Related Art

A Redundant Array of Independent Disks (RAID) is a technology that distributes and stores data across a plurality of hard disks, and is also referred to as a disk array. The RAID includes various schemes of distributing and storing data depending on a level. Reliability of a storage device may be increased or entire performance of the storage device may be improved depending on the level.

The storage device may store data in response to control of a host device such as a computer or a smartphone. The storage device may include a memory device storing data and a memory controller controlling the memory device. Generally, there are two types of memory devices: volatile memory devices and nonvolatile memory devices.

Volatile memory devices may store data only when power is supplied thereto, and may lose data stored therein when power is not supplied. Examples of volatile memory devices include a Static Random Access Memory (SRAM) device, a Dynamic Random Access Memory (DRAM) device, and the like.

Nonvolatile memory devices may retain stored data even when the supply of power is interrupted or blocked. Examples of nonvolatile memory devices include a Read Only Memory (ROM) device, a Programmable ROM (PROM) device, an Electrically Programmable ROM (EPROM) device, an Electrically Erasable and Programmable ROM (EEPROM) device, a flash 5 memory device, and the like.

SUMMARY

Various embodiments of the present disclosure are directed to a storage system capable of storing data according to a RAID method without a separate RAID controller included therein and a method of operating the storage system.

According to an embodiment of the present disclosure, a storage system may include a master storage device configured to store data based on a RAID level determined by a host, a slave storage device configured to store the data according to a command distributed from the master storage device, and a controller hub configured to couple the slave storage device to the master storage device, wherein the master storage device is further configured to transfer the command to the slave storage device through the controller hub when the master storage device receives a command processing request from the host, and to transmit a complete queue (CQ) to the host when operations of the master storage device and the slave storage device are completed in response to the command processing request.

According to an embodiment of the present disclosure, a method of operating a storage system, which includes a master storage device, a slave storage device, and a controller hub coupling the master storage device to the slave storage device, may include receiving, by the master storage device, a command processing request from a host, distributing, by the master storage device, the command processing request through the controller hub according to a predetermined Redundant Array of Independent Disks (RAID) level, performing, by the master and slave storage devices, an operation corresponding to the command processing request, and transmitting, by the master storage device, a complete queue (CQ) to the host, when the operation is completed.

According to an embodiment of the present disclosure, an operating method of a storage device may include distributing a Redundant Array of Independent Disks (RAID) request from a host to one or more slave storage devices through a hub while performing a RAID operation in response to the RAID request and transmitting a complete queue (CQ) to the host upon receiving responses from the slave storage devices, the responses indicating completion of the RAID operations by the respective slave storage devices in response to the RAID request.

DETAILED DESCRIPTION

Specific structural and functional features of the present disclosure are disclosed in the context of the following embodiments of the disclosure. However, the present disclosure may be configured, arranged, or carried out differently than disclosed herein. Thus, the present disclosure is not limited to any particular embodiment nor to any specific details. Also, throughout the specification, reference to "an embodiment," "another embodiment" or the like is not necessarily to only one embodiment, and different references to any such phrase are not necessarily to the same embodiment. Moreover, the use of an indefinite article (i.e., "a" or "an") means one or more, unless it is clear that only one is intended. Similarly, terms "comprising," "including," "having" and the like, when used herein, do not preclude the existence or addition of one or more other elements in addition to the stated element(s).

It should also be noted that features present in one embodiment may be used with one or more features of another embodiment without departing from the scope of the invention.

It is further noted, that in the various drawings, like reference numbers designate like elements.

Moreover, various modifications and changes may be applied to the described embodiments in accordance with the disclosed concepts. It is further noted that the described embodiments may be illustrated in simplified drawings. However, the embodiments according to the concepts of the present disclosure are not construed as limited to the specified disclosures, and may include all changes, equivalents, or substitutes that do not depart from the spirit and technical scope of the present disclosure. In some embodiments, well-known processes, device structures, and technologies will not be described in detail to avoid obfuscating the disclosure with well-known details. The intent is to disclose the gist of the present disclosure more clearly by omitting unnecessary description.

Hereinafter, various embodiments of the present disclosure are described in detail with reference to the accompanying drawings.

Figure 1:
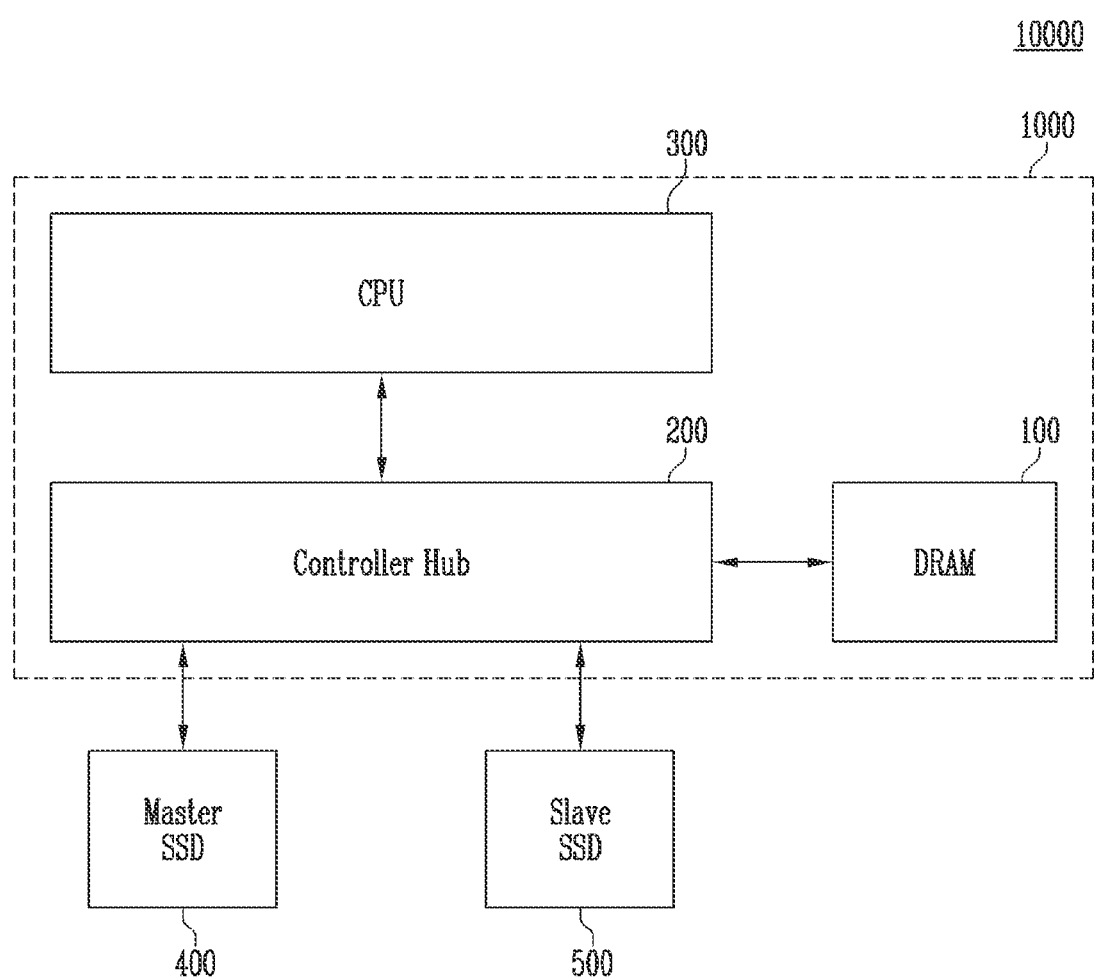
FIG. 1 is a diagram illustrating a computing system according to an embodiment of the present disclosure.

FIG. 1 is a diagram illustrating a computing system 10000 according to an embodiment of the present disclosure.

Referring to FIG. 1, the computing system 10000 may include a host device 1000, a master solid state drive (SSD) 400, and a slave SSD 500. For example, the computing system 10000 may be a cellular phone, a smartphone, an MP3 player, a laptop computer, a desktop computer, a display device, a tablet PC, or the like.

The host device 1000 may include Dynamic Random Access Memory (DRAM) 100, a controller hub 200, and a central processing unit (CPU) 300.

The DRAM 100 may store data, commands, or program codes used for performing operations of the host device 1000. According to an embodiment, the DRAM 100 may store program codes used for running one or more operating systems (OSs) and virtual machines (VMs), and program codes used for running a virtualization intermediary (VI) for managing VMs.

The controller hub 200 may be a root hub, a root complex, or a root controller in Peripheral Component Interconnect Express (PCIe) interconnect architecture. For example, the controller hub 200 may include a chipset, a memory controller hub (MCH), a northbridge, an interconnect controller hub (ICH), a southbridge, and a root controller/hub. In addition, the controller hub 200 may couple the DRAM 100 and the CPU 300 to an input/output (I/O) hierarchy. The controller hub 200 may support Peer-to-Peer (P2P) routing. The controller hub 200 may include at least one host bridge and at least one root port. The controller hub 200 may support one or more PCIe ports.

The CPU 300 may generally control the computing system 10000. More specifically, the CPU 300 may include circuits, interfaces, or program codes used for controlling data processing and operations of components of the computing system 10000.

The computing system 10000 may include the master SSD 400 and the slave SSD 500. The master SSD 400 and the slave SSD 500 may store data. More specifically, the master SSD 400 and the slave SSD 500 may store data received from the host device 1000 in response to a command processing request from the CPU 300. According to an embodiment of the present disclosure, when the master SSD 400 receives the command processing request from the CPU 300, the master SSD 400 may transfer a command corresponding to the slave SSD 500 to the slave SSD 500 through the controller hub 200. More specifically, the master SSD 400 may store data according to a Redundant Array of Independent Disks (RAID) level determined by the host device 1000 or the CPU 300. The master SSD 400 may transfer the command corresponding to the slave SSD 500 to the slave SSD 500 such that the slave SSD 500 stores the data according to the determined RAID level. The master SSD 400 may use P2P routing supported by the controller hub 200. Further, the master SSD 400 may serve as a RAID controller. Conventionally, a separate RAID controller is required to store or read data by a method corresponding to a RAID. However, according to an embodiment of the present disclosure, an SSD may perform a function of a RAID controller by using P2P routing without a separate RAID controller or hardware device.

The master SSD 400 and the slave SSD 500 may perform an internal operation corresponding to the command processing request. The internal operation may be a read operation for reading data stored in the master SSD 400 or the slave SSD 500, or a write operation for storing data in the master SSD 400 or the slave SSD 500. For example, the master SSD 400 or the slave SSD 500 may store data or read stored data by a method corresponding to a RAID level 0.

In the embodiments according to the present disclosure, the SSDs are described by different names, that is, the master SSD 400 and the slave SSD 500, for functional classification. However, when a computing system including SSDs is implemented, the same type of SSDs may be used. Alternatively, the master SSD 400 and the slave SSD 500 may be formed to have physically the same circuit. In addition, roles of the SSDs as the master SSD 400 or the slave SSD 500 may be determined by the host device 1000 or the CPU 300. More specifically, the host device 1000 or the CPU 300 may set one of a plurality of SSDs coupled to the host device 1000 to be a master SSD 400 and the remaining SSDs except for the master SSD 400 to be slave SSDs 500. The host device 1000 or the CPU 300 may determine the master SSD 400 and the slave SSD 500 according to a command input by a user using software or an application. In addition, a storage method according to a RAID level formed by the master SSD 400 and the slave SSD 500 may also be determined by the host device 1000 or the CPU 300 in the same way.

Alternatively, roles of the SSDs as the master SSD 400 or the slave SSD 500 may be determined by the host device 1000 or the CPU 300, and may be arbitrarily determined. More specifically, the host device 1000 or the CPU 300 may identify a plurality of SSDs coupled to the controller hub 200, and the host device 1000 or the CPU 300 may set an SSD coupled to a specific port of the controller hub 200 among the plurality of SSDs to perform a role as the master SSD 400. The specific port may refer to a port corresponding to an SSD coupled first to the controller hub 200 or the host device 1000 among the plurality of SSDs. Alternatively, the specific port may be a port corresponding to the smallest bus number among bus numbers. The above-described method amounts to an embodiment in which the master SSD 400 and the slave SSD 500 are set. However, the master SSD 400 and the slave SSD 500 may be set by various methods other than the above-described method.

FIG. 1 illustrates the embodiment having a structure in which solid state drives (SSDs), for example, the master SSD 400 and the slave SSD 500, are coupled to the host device 1000. However, an embodiment of the present disclosure is not limited thereto, and the master SSD 400 and the slave SSD 500 may be replaced by a storage device other than the SSD. For example, the master SSD 400 and the slave SSD 500 may be embodied as one of various types of storage devices such as a multimedia card in the form of a multimedia card (MMC), (e.g., an eMMC, an RS-MMC, or a micro-MMC), a secure digital card in the form of an SD (e.g., a mini-SD or a micro-SD), a Universal Serial Bus (USB) storage device, a Universal Flash Storage (UFS) device, a Personal Computer Memory Card International Association (PCMCIA) card type storage device, a Peripheral Component Interconnect (PCI) card type storage device, a PCI Express (PCIe) card type storage device, a Compact Flash (CF) card, a smart media card, and/or a memory stick.

Figure 2:
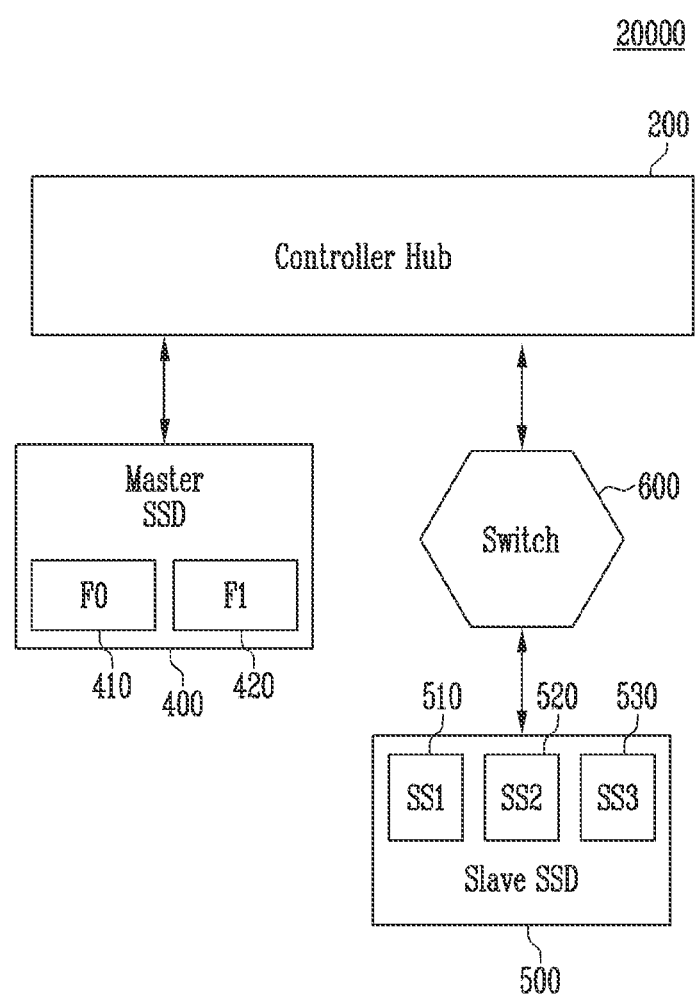
FIG. 2 is a diagram illustrating a storage system according to an embodiment of the present disclosure.

FIG. 2 is a diagram illustrating a storage system 20000 according to an embodiment of the present disclosure.

Referring to FIG. 2, the storage system 20000 may include the controller hub 200, the master SSD 400, and a slave SSD 500. Because the controller hub 200 and the master SSD 400 are described above in detail, the repeated description will be omitted for the sake of brevity.

The master SSD 400 may include functions. More specifically, the master SSD 400 may include a function 0 410 and a function 1 420. The function may be a unit of an individual operation for providing physical resources included in a storage device. In FIG. 2, by way of example, two functions included in the master SSD 400 are illustrated. However, depending on embodiments, the number of functions included in the master SSD 400 is not limited to two, and the slave SSD 500 may also include a plurality of functions.

The slave SSD 500 may include a plurality of SSDs. More specifically, the slave SSD 500 may include a first slave SSD 510, a second slave SSD 520, and a third slave SSD 530. Because each of the first to third slave SSDs 510 to 530 is described in detail with reference to FIG. 1, the repeated description will be omitted for the sake of brevity. The first slave SSD 510, the second slave SSD 520, and the third slave SSD 530 together may be treated as a single storage array according to the RAID scheme to be described below. According to an embodiment of the present disclosure, the first slave SSD 510, the second slave SSD 520, and the third slave SSD 530 may perform an internal operation according to commands distributed from the master SSD 400. The internal operation may be a read operation for reading data stored in the slave SSD 500, or a write operation for storing data in the slave SSD 500. In FIG. 2, by way of example, three SSDs included in the slave SSD 500 are illustrated. However, the number of SSDs included in the slave SSD 500 is not limited thereto.

A switch 600 may route a packet or a message upstream or downstream. More specifically, the switch 600 may route the packet or the message upward from the slave SSD 500 towards the controller hub 200. Alternatively, the switch 600 may route the packet or the message downward from the controller hub 200 towards the slave SSD 500.

According to an embodiment, the switch 600 may be referred to as a logic assembly of a plurality of virtual PCI-to-PCI bridge devices. Examples of devices that may be coupled to the switch 600 include an arbitrary internal or external device, or a component coupled to electronic systems such as an I/O device, a network interface controller (NIC), an add-in card, an audio processor, a network processor, a hard drive, a storage device, CD/DVD ROM, a monitor, a printer, a mouse, a keyboard, a router, a mobile storage device, a FireWire device, a Universal Serial Bus (USB) device, a scanner, and another input/output device. Although not illustrated in detail, the device may include a PCIe-to-PCI/PCIX bridge supporting a legacy version or another version of a PCI device.

Figure 3:
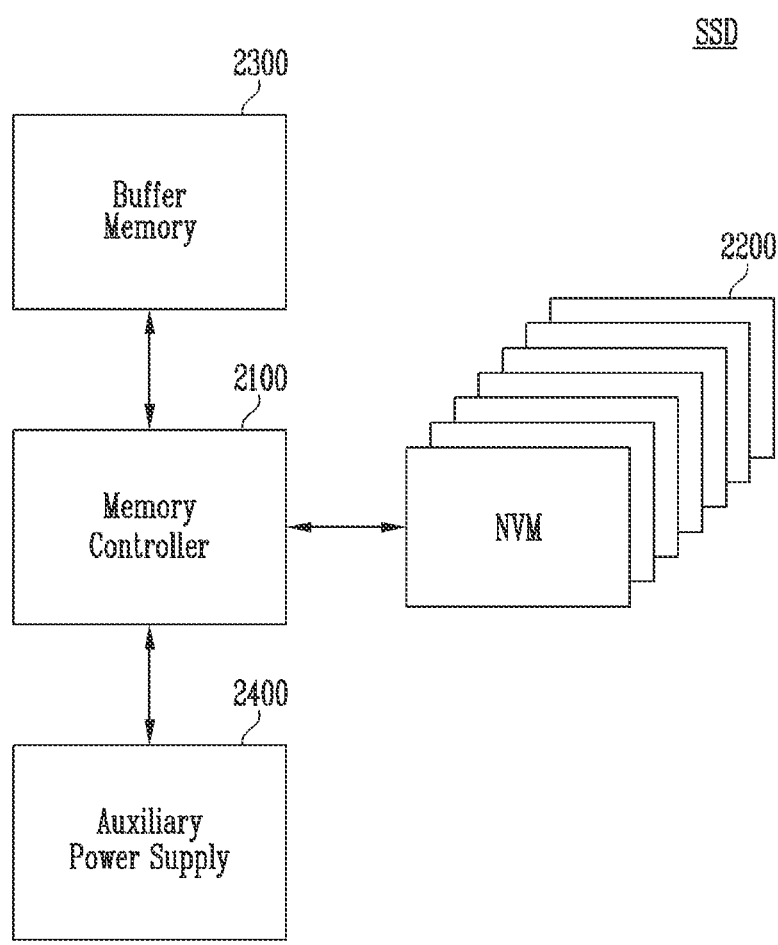
FIG. 3 is a diagram illustrating a solid state drive (SSD) according to an embodiment of the present disclosure.

FIG. 3 is a diagram illustrating a solid state drive (SSD) according to an embodiment of the present disclosure.

Referring to FIG. 3, the SSD may include a memory controller 2100, a plurality of flash memory 2200, a buffer memory 2300, and an auxiliary power supply 2400.

According to an embodiment, the memory controller 2100 may control the plurality of flash memory 2200 in response to signals received from the host device 1000. For example, the signals may be signals based on interfaces of the host device 1000 and the SSD. More specifically, the signals may be signals defined according to a Peripheral Component Interconnect (PCI) or PCI Express (PCIe) or defined by at least one of interfaces such as a Universal Serial Bus (USB), a multimedia card (MMC), an embedded MMC (eMMC), Advanced Technology Attachment (ATA), Serial-ATA, Parallel-ATA, a Small Computer System Interface (SCSI), an Enhanced Small Disk Interface (ESDI), Integrated Drive Electronics (IDE), FireWire, Universal Flash Storage (UFS), Wifi, Bluetooth, and nonvolatile memory express (NVMe).

The buffer memory 2300 may operate as an internal memory of the SSD. For example, the buffer memory 2300 may temporarily store data received from the host device 1000 or data received from the plurality of flash memory 2200, or may temporarily store metadata (e.g., mapping tables) of the plurality of flash memory 2200. The buffer memory 2300 may include volatile memory such as Dynamic Random Access Memory (DRAM), Synchronous DRAM (SDRAM), Double Data Rate SDRAM (DDR SDRAM), Low Power DDR SDRAM (LPDDR SDRAM), and Graphic RAM (GRAM) or nonvolatile memory such as Ferroelectric RAM (FRAM), Resistive RAM (ReRAM), Spin-Transfer Torque Magnetic RAM (STT-MRAM), and Phase-change RAM (PRAM).

The auxiliary power supply 2400 may be charged with power supplied from the host device 1000. The auxiliary power supply 2400 may supply power to the SSD when power is not smoothly supplied from the host device 1000. For example, the auxiliary power supply 2400 may be disposed within or external to the SSD. For example, the auxiliary power supply 2400 may be disposed on a main board and may supply auxiliary power to the SSD.

Figure 4:
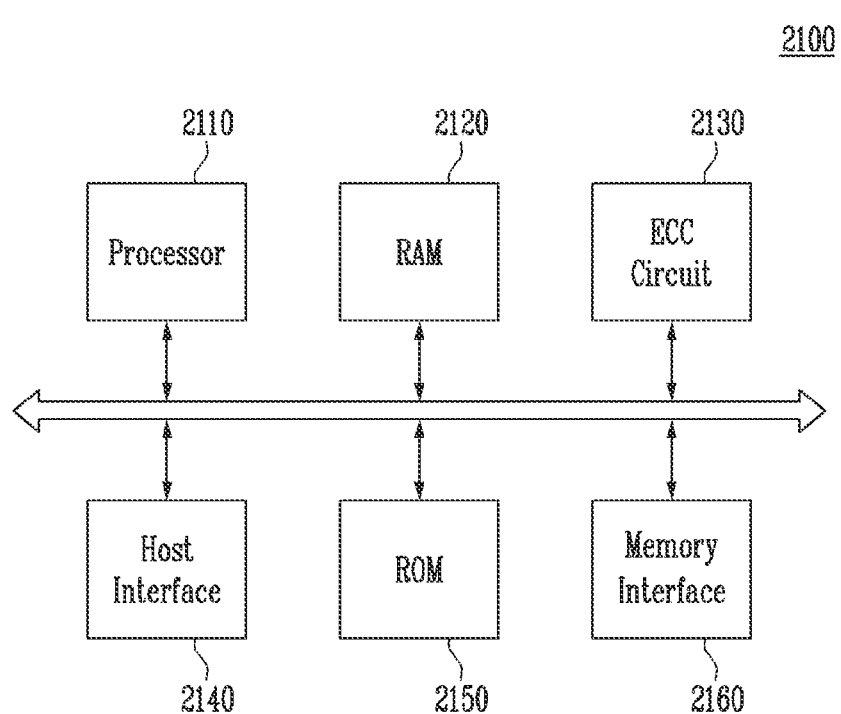
FIG. 4 is a diagram illustrating a memory controller according to an embodiment of the present disclosure.

FIG. 4 is a diagram illustrating the memory controller 2100 according to an embodiment of the present disclosure.

Referring to FIG. 4, the memory controller 2100 may include a processor 2110, RAM 2120, an error correction code (ECC) circuit 2130, a host interface 2140, ROM 2150, and a memory interface 2160. The memory controller 2100 illustrated in FIG. 4 is an embodiment of the memory controller 2100 shown in FIG. 3.

The processor 2110 may communicate with the host device 1000 or the CPU 300 using the host interface 2140 and perform a logical operation to control an operation of the memory controller 2100. For example, the processor 2110 may load a program command, a data file, or a data structure, perform various operations, or generate a command and an address based on a request received from the host device 1000 or the CPU 300. For example, the processor 2110 may generate various commands used for performing a program operation, a read operation, an erase operation, a suspend operation, and a parameter setting operation.

The processor 2110 may perform a function of a flash translation layer (FTL). The processor 2110 may translate a logical block address (LBA), provided by the host device 1000 or the CPU 300, into a physical block address (PBA) through the FTL. The FTL may receive the LBA and translate the LBA into the PBA by using a mapping table. There are various address mapping methods for the FTL depending on a mapping unit. Typical address mapping methods include a page mapping method, a block mapping method, and a hybrid mapping method.

The processor 2110 may generate a command without a request from the host device 1000. For example, the processor 2110 may generate a command for background operations such as operations for wear leveling of a memory device and operations for garbage collection of the memory device.

The RAM 2120 may serve as buffer memory, operational memory, or cache memory of the processor 2110. The RAM 2120 may store codes and commands executed by the processor 2110. The RAM 2120 may store data processed by the processor 2110. When the RAM 2120 is implemented, the RAM 2120 may include Static RAM (SRAM) or Dynamic RAM (DRAM).

The ECC circuit 2130 may detect and correct an error during a program operation or a read operation. More specifically, the ECC circuit 2130 may perform an error correction operation according to an error correction code (ECC). The ECC circuit 2130) may perform ECC encoding based on data to be written to the memory device. The ECC-encoded data may be transferred to the memory device through the memory interface 2160. In addition, the ECC circuit 2130 may perform ECC decoding on data received from the memory device through the memory interface 2160.

The host interface 2140 may include a protocol for exchanging data between the host device 1000 and the memory controller 2100. More specifically, the host interface 2140 may be configured to communicate with the host device 1000 using a Peripheral Component Interconnect (PCI) protocol or a PCI Express (PCIe) protocol. In addition, the host interface 2140 may communicate with the host device 1000 through one or more various interface protocols such as a Universal Serial Bus (USB) protocol, a multimedia card (MMC) protocol, an Advanced Technology Attachment (ATA) protocol, a Serial-ATA protocol, a Parallel-ATA protocol, a Small Computer System Interface (SCSI) protocol, an Enhanced Small Disk Interface (ESDI) protocol, an Integrated Drive Electronics (IDE) protocol, and a private protocol.

The ROM 2150 may serve as a storage unit storing various types of information used for operations of the memory controller 2100. More specifically, the ROM 2150 may include a map table and the map table may store physical-to-logical address information and logical-to-physical address information. The ROM 2150 may be controlled by the processor 2110.

The memory interface 2160 may communicate with the memory device using a communication protocol according to control of the processor 2110. More specifically, the memory interface 2160 may communicate commands, addresses, and data with the memory device through channels. For example, the memory interface 2160 may include a NAND interface.

Figure 5:
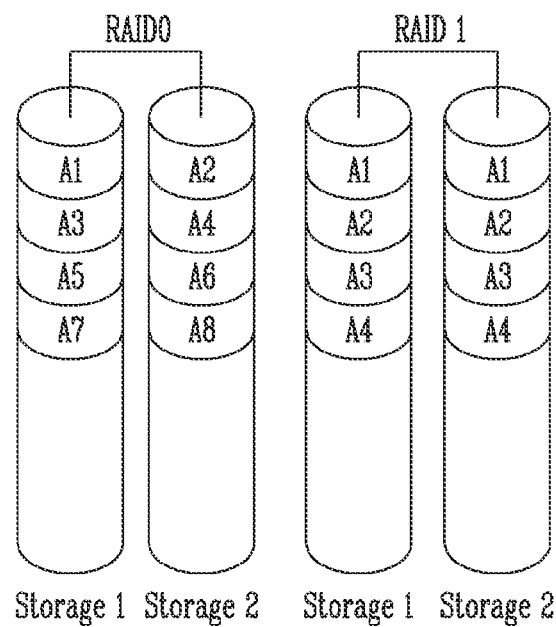
FIG. 5 is a diagram illustrating a RAID level 0 and a RAID level 1 according to an embodiment of the present disclosure.

FIG. 5 is a diagram illustrating a RAID level 0 and a RAID level 1 according to an embodiment of the present disclosure.

Referring to FIG. 5, storage methods according to the RAID level 0 and the RAID level 1 are illustrated. The RAID may be a methodology or scheme of distributing and storing data across a plurality of storage devices. According to the RAID scheme, the plurality of storage devices are regarded as a single storage array. The RAID scheme has several levels including RAID levels 0 to 6 and more, according to a structure of the storage devices as the single storage array.

According to the RAID level 0, data may be stored by striping the data in a plurality of storage devices. The term "striping" may refer to an operation of distributing the data across the plurality of storage devices. According to the RAID level 0, at least two storage devices may be used. For example, according to the RAID level 0, a first storage device and a second storage device may be used. For example, according to the RAID level 0, data A may be striped across the first storage device and the second storage device such that a first block A1, a third block A3, a fifth block A5, and a seventh block A7 are stored in the first storage device and a second block A2, a fourth block A4, a sixth block A6, and an eighth block A8 are stored in the second storage device.

According to the RAID level 0, plural pieces (e.g., the first to eighth block A1 to A8) of data (e.g., the data A) are distributed and stored in the plurality of storage devices, and therefore a storage speed may be high and capacities of the plurality of storage devices may be utilized as much as possible. On the other hand, according to the RAID level 0, when an error occurs in one data piece (e.g., the first block A1) stored in a single storage device among the plural storage devices, entire data (e.g., the data A) striped into the plurality of storage devices might not be reliable. Accordingly, stability of stored data might not be ensured.

According to the RAID level 1, data may be stored by mirroring the data in a plurality of storage devices. The term "mirroring" may refer to an operation of copying the identical data onto the plurality of storage devices. According to the RAID level 1, at least two storage devices may be used. For example, in the storage method corresponding to the RAID level 1, a first storage device and a second storage device may be used. For example, according to the RAID level 1, data A may be mirrored on the first storage device and the second storage device such that a first block A1, a second block A2, a third block A3, and a fourth block A4 are stored in the first storage device and the identical set of data pieces, that is, the first block A1, the second block A2, the third block A3, and the fourth block A4 are stored in the second storage device.

According to the RAID level 1, the identical data is mirrored on the plurality of storage devices. Accordingly, when an error occurs in some data pieces (e.g., the first to fourth blocks A1 to A4) stored in some (e.g., the first storage device) of the plurality of storage devices and even when only one storage device (e.g., the second storage device) in which an error does not occur exists among the plurality of storage devices, data (e.g., the data A) may be recovered. On the other hand, according to the RAID level 1, because data is copied and then stored, performance and capacities according to the RAID level 1 may be lower than other RAID levels.

Figure 6:
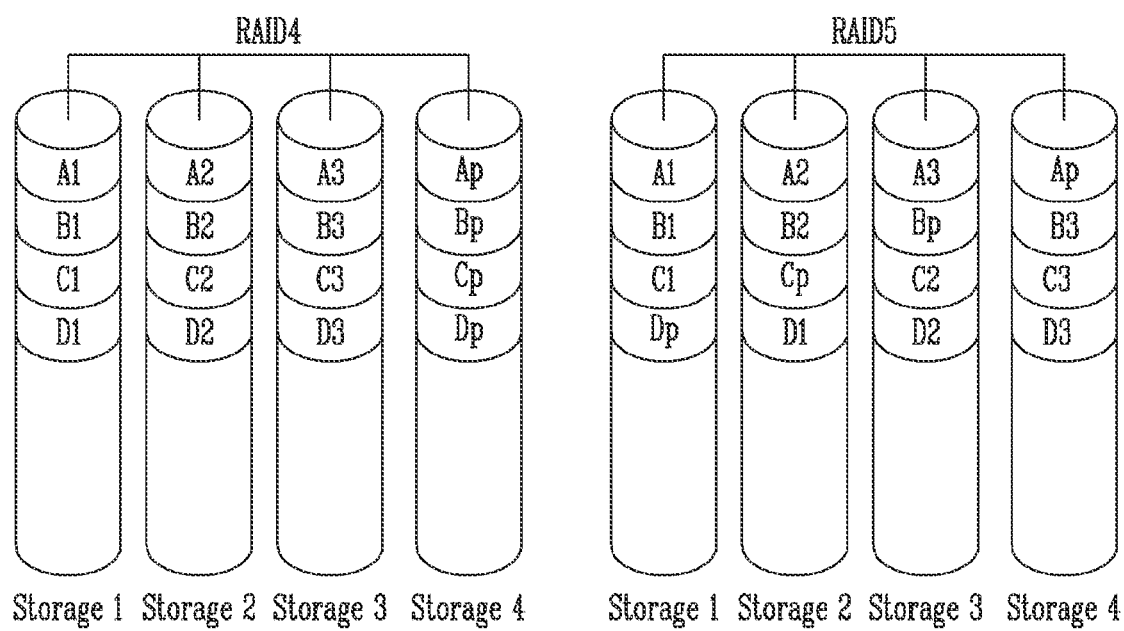
FIG. 6 is a diagram illustrating a RAID level 4 and a RAID level 5 according to an embodiment of the present disclosure.

FIG. 6 is a diagram illustrating the RAID level 4 and the RAID level 5 according to an embodiment of the present disclosure.

Referring to FIG. 6, storage schemes according to the RAID level 4 and the RAID level 5 are illustrated.

According to the RAID level 4, data may be stored by striping the data in a plurality of storage devices and storing a parity for error correction in a single storage device. According to the RAID level 4, at least three storage devices may be used. For example, according to the RAID level 4, a first storage device, a second storage device, a third storage device, and a fourth storage device may be used. The parity may refer to a data piece used to detect and correct an error of the data through an exclusive OR (EOR) operation or the like. For example, according to the RAID level 4, when data A, data B, data C, and data D is to be stored, each of the data A, the data B, the data C, and the data D is striped across the first, second, and third storage devices. For example, plural pieces (e.g., the first to third block A1 to A3) of the data A are distributed and stored in the first to third storage devices. In addition, according to the RAID level 4, a parity (e.g., a parity Ap) of each data (e.g., the data A) stored in the first, second, and third storage devices may be stored in the fourth storage device. That is, according to the RAID level 4, data is split and stored across (n−1) storage devices and one storage device may be used as a parity dedicated storage device. For example, when the data A is stored according to the RAID level 4, a first block A1 of the data A may be stored in the first storage device, a second block A2 of the data A may be stored in the second storage device, a third block A3 of the data A may be stored in in the third storage device, and a parity Ap of the data A may be stored in in the fourth storage device. According to the RAID level 4, even when an error occurs in one data piece (e.g., the first block A1) stored in a single storage device among the plural storage devices, the whole data (e.g., the data A) may be recovered because of the parity (e.g., the parity Ap) stored in the parity dedicated storage device. However, when errors occur in two or more data pieces (e.g., the first to third block A1 to A3) stored in the storage devices, the whole data (e.g., the data A) might not be recovered from the errors and load may be applied to the storage device storing the parity. In addition, because a parity calculation is required to store the parity, data storage performance may deteriorate.

According to the RAID level 5, data may be stored by striping the data in a plurality of storage devices and storing a parity for error correction in a single storage device. According to the RAID level 5, at least three storage devices may be used. For example, according to the RAID level 5, a first storage device, a second storage device, a third storage device, and a fourth storage device may be used. For example, according to the RAID level 5, when data A, data B, data C, and data D are to be stored, each of the data A, the data B, the data C, and the data D is striped across three of the first to fourth storage devices. For example, plural pieces (e.g., the first to third block A1 to A3) of the data A are distributed and stored in the first to third storage devices. In addition, according to the RAID level 5, a parity (e.g., a parity Ap) of each data (e.g., the data A) stored in the three storage devices may be stored in a remaining one storage device other than the three storage devices among the first, second, third, and fourth storage devices.

The RAID level 5 is the same as the RAID level 4 in that each data is split and stored across (n−1) storage devices and a parity for the data is stored in one storage device. However, the RAID level 5 is different from the RAID level 4 in that, according to the RAID level 5, parities are not stored in a single dedicated storage device but distributed and stored in the plurality of storage devices. For example, when the data A to D are to be stored according to the RAID level 5, a parity Ap of the data A may be stored in the fourth storage device, a parity Bp of the data B in the third storage device, a parity Cp of the data C in the second storage device, and a parity Dp of the data D in the first storage device. According to the RAID level 5, the parities are distributed and stored in the plurality of storage devices, and therefore load, which occurs when a parity is calculated and stored, may be mitigated. In addition, according to the RAID level 5, even when an error occurs in one data piece (e.g., the first block A1) stored in a single storage device among the plural storage devices, the whole data (e.g., the data A) may be recovered because of the parity (e.g., the parity Ap) stored in the storage device. However, when errors occur in two or more data pieces (e.g., the first to third block A1 to A3) stored in the storage devices, the whole data (e.g., the data A) might not be recovered and load may be applied to the storage devices storing the parities. In addition, because a parity calculation is required to store the parity, data storage performance may deteriorate.

Although not illustrated in FIG. 6, the RAID level 6 may reinforce the parity scheme on the RAID level 5 to ensure stability. According to the RAID level 6, data may be split and stored across (n−2) storage devices and parities for the data may be stored in two storage devices. The RAID level 6 may require at least four storage devices. In addition, according to the RAID level 6, even when errors occur in two data pieces stored in two storage devices, the whole data may be recovered by the parities stored in the two storage devices.

Figure 7:
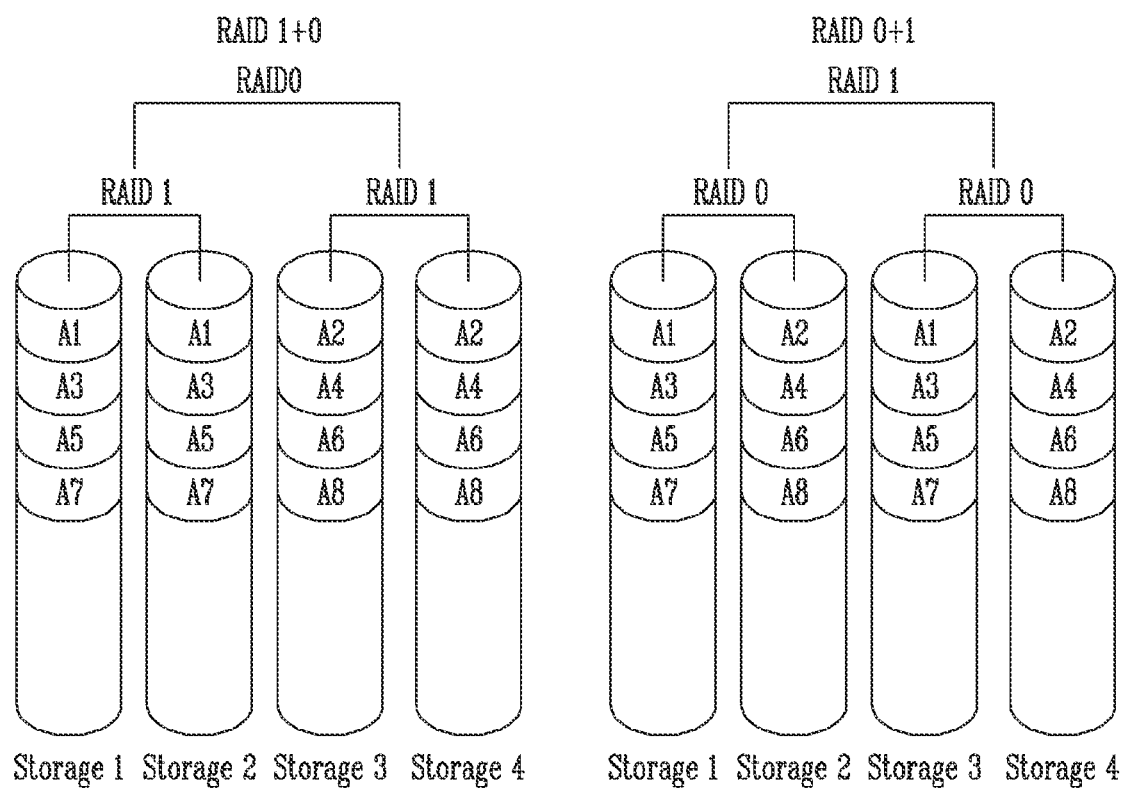
FIG. 7 is a diagram illustrating nested RAID levels according to an embodiment of the present disclosure.

FIG. 7 is a diagram illustrating nested RAID levels according to an embodiment of the present disclosure.

Referring to FIG. 7, a RAID level 1+0 and a RAID level 0+1 using a combination of the RAID level 0 and the RAID level 1 are illustrated. The RAID level 1+0 and the RAID level 0+1 may be based on the RAID level 0 and the RAID level 1.

The RAID level 1+0 may require at least four storage devices, for example, a first storage device, a second storage device, a third storage device, and a fourth storage device. According to the RAID level 1+0, the first storage device and the second storage device may mirror and store the same data. The third storage device and the fourth storage device may mirror and store the same data. According to the RAID level 1+0, storage device groups of storage devices that are grouped by the RAID level 1 may be grouped by the RAID level 0. For example, according to the RAID level 1+0, a group of the first storage device and the second storage device may be striped with a group of the third storage device and the fourth storage device.

The RAID level 0+1 may require at least four storage devices, for example, a first storage device, a second storage device, a third storage device, and a fourth storage device. According to the RAID level 0+1, data may be striped and stored across the first storage device and the second storage device. In addition, the data stored across the first and second storage devices may be mirrored on and stored in the third storage device and the fourth storage device. According to the RAID level 0+1, groups of storage devices that are grouped by the RAID level 0 may be grouped by the RAID level 1. For example, according to the RAID level 0+1, a group of the first storage device and the second storage device may mirror data into a group of the third storage device and the fourth storage device.

Figure 8:
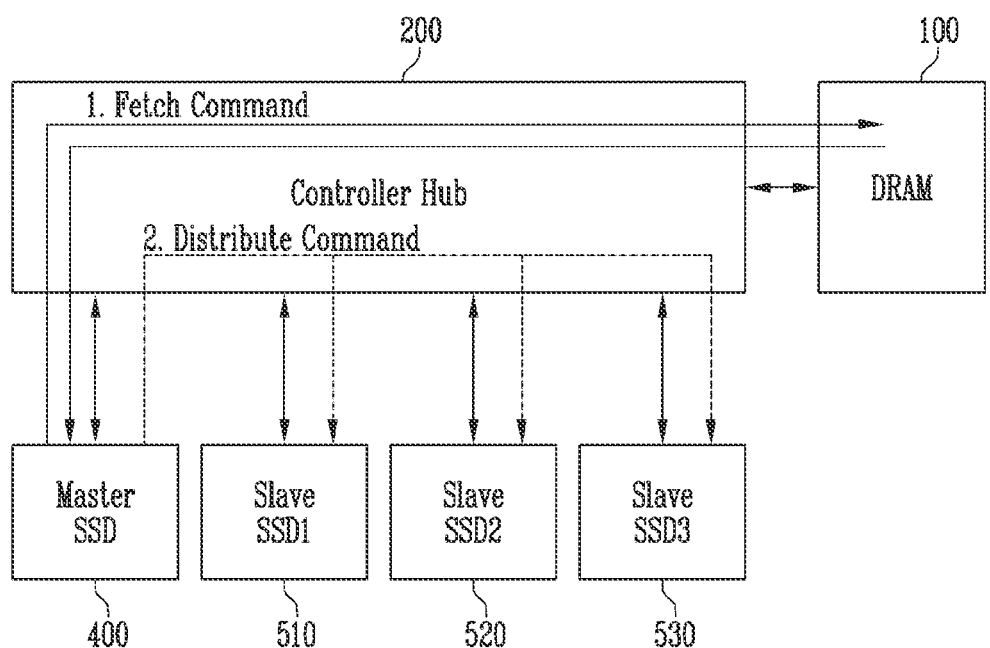
FIG. 8 is a diagram illustrating a method of operating a storage system according to an embodiment of the present disclosure.
Figure 9:
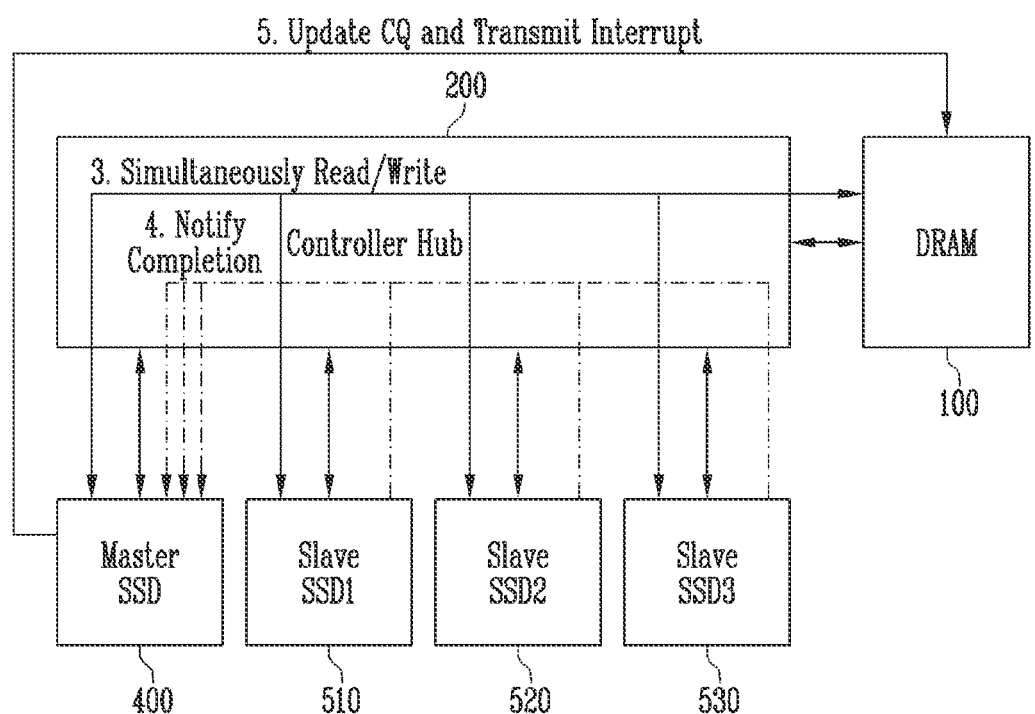
FIG. 9 is a diagram illustrating a method of operating a storage system according to an embodiment of the present disclosure.

FIGS. 8 and 9 are diagrams illustrating a method of operating a storage system 20000 according to an embodiment of the present disclosure. In FIGS. 8 and 9, by way of example, a RAID level is the RAID level 0 that is described above with reference to FIG. 5 in the context of the following description of the method of operating the storage device.

Referring to FIG. 8, the DRAM 100 and the storage system 20000 are illustrated. The storage system 20000 may include the controller hub 200, the master SSD 400, the first slave SSD 510, the second slave SSD 520, and the third slave SSD 530.

The master SSD 400 may receive a command processing request from the host device 1000. The command processing request may include a write request or a read request.

In a write operation, the host device 1000 may transfer the command processing request only to the master SSD 400. More specifically, the CPU 300 of the host device 1000 may store data and commands in the DRAM 100, and the master SSD 400 may fetch the commands from the DRAM 100. The master SSD 400 may distribute the commands to respective slave SSDs based on a determined RAID level. More specifically, the master SSD 400 may transfer the commands respectively corresponding to the first slave SSD 510, the second slave SSD 520, and the third slave SSD 530 to the first slave SSD 510, the second slave SSD 520, and the third slave SSD 530 in a one-to-one manner. In addition, each of the master SSD 400, the first slave SSD 510, the second slave SSD 520, and the third slave SSD 530 may perform a write operation corresponding to the command processing request. More specifically, each of the master SSD 400, the first slave SSD 510, the second slave SSD 520, and the third slave SSD 530 may receive pieces of data respectively corresponding to the master SSD 400, the first slave SSD 510, the second slave SSD 520, and the third slave SSD 530 from the DRAM 100 based on the commands. Each of the master SSD 400, the first slave SSD 510, the second slave SSD 520, and the third slave SSD 530 may receive data used for performing the write operation. For example, the master SSD 400, the first slave SSD 510, the second slave SSD 520, and the third slave SSD 530 may store pieces of data respectively corresponding to the master SSD 400, the first slave SSD 510, the second slave SSD 520, and the third slave SSD 530 among pieces of data striped according to the RAID level 0. In addition, the first slave SSD 510, the second slave SSD 520, and the third slave SSD 530 may notify completion of operations corresponding to the received commands to the master SSD 400. When operations of the master SSD 400, the first slave SSD 510, the second slave SSD 520, and the third slave SSD 530 are completed, the master SSD 400 may notify completion of the operations to the host device 1000. More specifically, the master SSD 400 may transmit a complete queue (CQ) to the host device 1000.

In a read operation, the host device 1000 may transfer the command processing request only to the master SSD 400. More specifically, the CPU 300 of the host device 1000 may store commands in the DRAM 100, and the master SSD 400 may fetch the commands from the DRAM 100. The master SSD 400 may distribute the commands to respective slave SSDs based on a determined RAID level. More specifically, the master SSD 400 may transfer the commands respectively corresponding to the first slave SSD 510, the second slave SSD 520, and the third slave SSD 530 to the first slave SSD 510, the second slave SSD 520, and the third slave SSD 530 in a one-to-one manner. In addition, each of the master SSD 400, the first slave SSD 510, the second slave SSD 520, and the third slave SSD 530 may perform a read operation corresponding to the command processing request.

More specifically, each of the master SSD 400, the first slave SSD 510, the second slave SSD 520, and the third slave SSD 530 may transmit data corresponding to each of the master SSD 400, the first slave SSD 510, the second slave SSD 520, and the third slave SSD 530 to the DRAM 100 based on the commands. Each of the master SSD 400, the first slave SSD 510, the second slave SSD 520, and the third slave SSD 530 may transmit data, which is read, to the DRAM 100. For example, the master SSD 400, the first slave SSD 510, the second slave SSD 520, and the third slave SSD 530 may transmit pieces of data respectively corresponding to the master SSD 400, the first slave SSD 510, the second slave SSD 520, and the third slave SSD 530 among pieces of data striped according to the RAID level 0. In addition, the first slave SSD 510, the second slave SSD 520, and the third slave SSD 530 may notify completion of operations corresponding to the received commands to the master SSD 400. When the operations of the master SSD 400, the first slave SSD 510, the second slave SSD 520, and the third slave SSD 530 are completed, the master SSD 400 may notify completion of the operations to the host device 1000. More specifically, the master SSD 400 may transmit a complete queue (CQ) to the host device 1000. In the CQ, completion information about a command requested from the host device 1000 may be stored.

In FIGS. 8 and 9, by way of example, the operation of the storage system 20000 is described according to the RAID level 0. However, a RAID level is not limited to the RAID level 0.

More specifically, for example, when the operation of the storage system 20000 is performed according to the RAID level 1, a read operation of the storage system 20000 may be performed in the same manner as that according to the RAID level 0. However, in a write operation, the master SSD 400, the first slave SSD 510, the second slave SSD 520, and the third slave SSD 530 may store the same data.

For example, when the operation of the storage system 20000 is performed according to the RAID level 4, the master SSD 400 may calculate and store a parity. In a write operation, each slave SSD 500 may store data received from the DRAM 100, and each slave SSD 500 may transmit the stored data to the master SSD 400. In addition, the master SSD 400 may perform a parity calculation using the data received from the slave SSDs 500, and may store a parity. In a read operation, each slave SSD 500 may also transmit, to the master SSD 400, the data that is to be transmitted to the DRAM 100. In addition, the master SSD 400 may perform a parity calculation and an error correction on the data received from the slave SSDs 500.

For example, when the operation of the storage system 20000 is performed according to the RAID level 5 or the RAID level 6, the master SSD 400 and the slave SSDs 500 may serve as devices storing parities and may transmit data for a parity calculation regardless of roles of the master SSD 400 and the slave SSD 500. A parity check calculation of the RAID level 4 may be performed by any of the master SSD 400 and the slave SSD 500 regardless of their roles.

Figure 10:
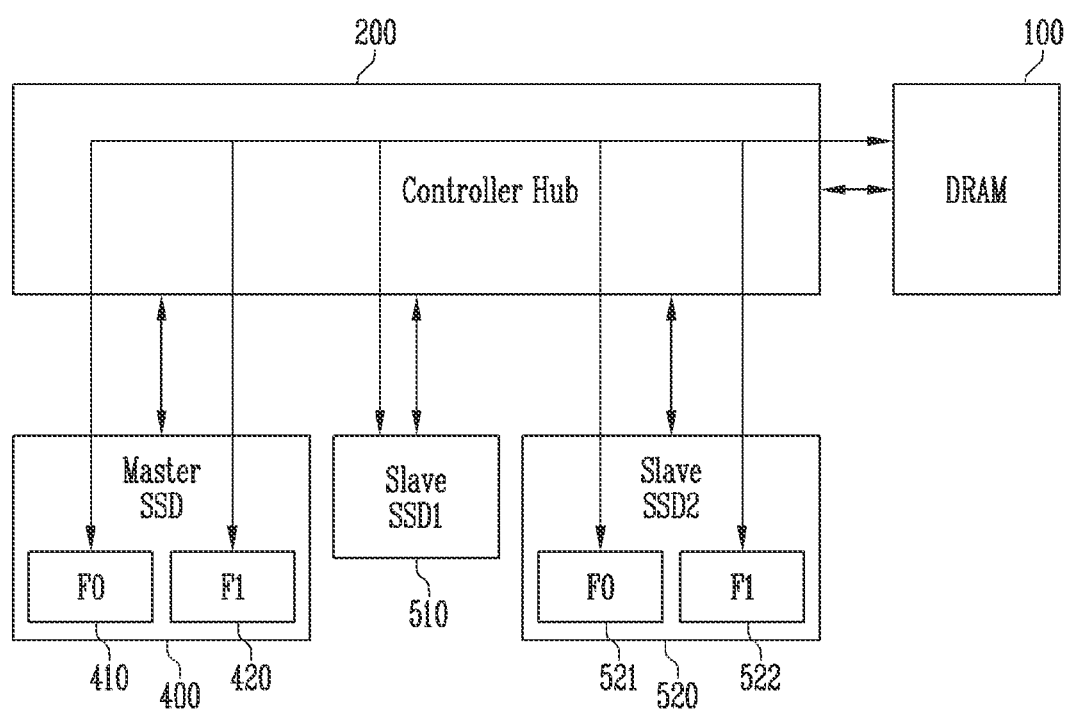
FIG. 10 is a diagram illustrating an operation of a storage system including a plurality of functions according to an embodiment of the present disclosure.

FIG. 10 is a diagram illustrating an operation of a storage system including a plurality of functions according to an embodiment of the present disclosure.

Referring to FIG. 10, each of the master SSD 400 and the second slave SSD 520 may include a plurality of functions. The function may be a unit of individual operation for providing physical resources included in a storage device. More specifically, the master SSD 400 may include the function F0 410 and the function F1 420 and the second slave SSD 520 may include a function F0 521 and a function F1 522. Each of the functions is a unit of individual operation. Therefore, although including three physical SSDs, that is, the master SSD 400, the first slave SSD 510, and the second slave SSD 520, the storage system 20000 may be implemented to have five functional SSDs.

According to an embodiment, the function F0 410 included in the master SSD 400 may serve as the master SSD 400 described above with reference to FIGS. 8 and 9. In addition, the function F1 420 included in the master SSD 400, the first slave SSD 510, and the function F0 521 and the function F1 522 included in the second slave SSD 520 may serve as the slaves SSD 500 described above with reference to FIGS. 8 and 9.

Figure 11:
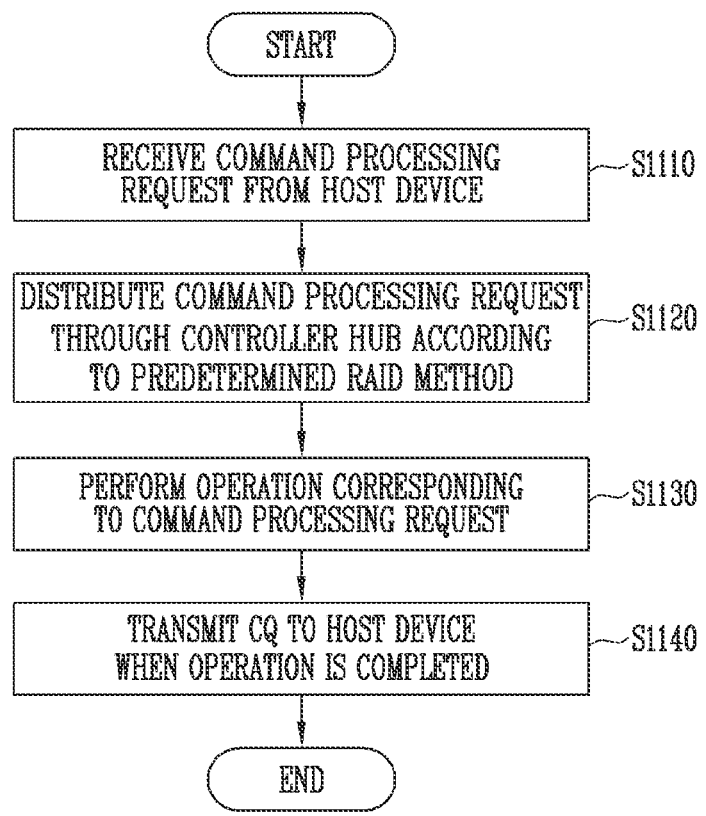
FIG. 11 is a diagram illustrating a method of operating a storage system according to an embodiment of the present disclosure.

FIG. 11 is a diagram illustrating a method of operating a storage system according to an embodiment of the present disclosure.

The storage system 20000 may include a master storage device, a slave storage device, and a controller hub coupling the master storage device to the slave storage device. The master storage device and the slave storage device may be solid state drives (SSDs). The controller hub may be a root complex supporting a protocol according to Peripheral Component Interconnect Express (PCIe). The storage system 20000 may receive a command processing request from a host device (S1110). The host device may provide the command processing request to the master storage device by using host memory.

The storage system 20000 may distribute the command processing request through the controller hub according to a predetermined RAID scheme (S1120). More specifically, the master storage device may distribute a command to the slave storage device corresponding to the received command according to a predetermined RAID level or the predetermined RAID scheme.

The storage system 20000 may perform an operation corresponding to the command processing request (S1130). The operation corresponding to the command processing request may be a write operation for storing data or a read operation for reading the stored data according to the predetermined RAID scheme. When the operation corresponding to the command processing request is completed, the storage system 20000 may transmit a complete queue (CQ) to the host device (S1140).

The storage system 20000 might not include a separate RAID controller which supports a RAID scheme; instead, an SSD in the storage system 20000 may be used to perform a function of a RAID controller. A function of the SSD may replace a function of a RAID controller by using Peer-to-Peer (P2P) routing without a separate RAID controller or hardware device being further included in the storage system 20000.

According to embodiments of the present disclosure, a storage system 20000 capable of storing data according to a RAID method without a separate RAID controller and a method of operating the storage system may be provided.

What is claimed is:

1. A storage system, comprising:
a master storage device having a first function and a second function, the first function being configured to operate as a Redundant Array of Independent Disks (RAID) controller for providing a command to store data based on a RAID level determined by a host;
a slave storage device having at least a third function configured to store the data according to the command distributed from the master storage device; and
a controller hub configured to couple the slave storage device to the master storage device,
wherein each of the master storage device and the slave storage device includes a dedicated non-volatile memory device for storing the data, respectively,
wherein the master storage device includes a module on which a first memory controller executing the first function and the second function and a first non-volatile memory are mounted,
wherein the master storage device is further configured to control the slave storage device such that the data is mirrored on the slave storage device and the master storage device,
wherein the master storage device is further configured to:
transfer the command to the slave storage device through the controller hub when the master storage device receives a command processing request from the host; and
transmit a complete queue (CQ) to the host when operations of the master storage device and the slave storage device are completed in response to the command processing request,
wherein the second function is configured to operate as another slave storage device controlled by the first function, and
wherein the slave storage device and the master storage device operating according to the second function receive and store different pieces of data received from the host, under control of the master storage device operating as the RAID controller according to the first function.

2. The storage system of claim 1,
wherein the master storage device receives a first command from the host, generates a second command according to the RAID level, and provides the second command to the slave storage device,
wherein the master storage device includes a first host interface, and the slave storage device includes a second host interface, the first and second host interfaces using a PCI Express (PCIe) protocol,
wherein each of the first and second functions is a unit of an individual operation for providing physical resources of the master storage device, and
wherein the first and second functions are in the first host interface.

3. The storage system of claim 1, wherein the master storage device is further configured to generate and store therein a parity for error correction of the data.

4. The storage system of claim 1, wherein at least one of the master storage device and the slave storage device is further configured to store therein a parity for error correction of the data.

5. The storage system of claim 1,
wherein the command processing request includes a read request for reading the data stored in the master and slave storage devices,
wherein the master storage device is further configured to read therefrom one or more pieces of the data corresponding to the read request and to transmit the one or more pieces read from the master storage device to host memory, and
wherein the slave storage device is further configured to read therefrom one or more pieces of the data corresponding to the read request and to transmit the one or more pieces read from the slave storage device to the host memory.

6. The storage system of claim 1,
wherein the command processing request includes a write request for storing the data into the master and slave storage devices,
wherein the master storage device is further configured to receive one or more pieces of the data corresponding to the write request from host memory, and to store therein the one or more pieces received from the host memory, and
wherein the slave storage device is further configured to receive one or more pieces of the data corresponding to the write request from the host memory, and to store therein the one or more pieces received from the host memory.

7. The storage system of claim 1, wherein the slave storage device is further configured to notify completion of the operation thereof to the master storage device when the operation thereof is completed in response to the command processing request.

8. The storage system of claim 1, wherein the controller hub is further configured to support Peer-to-Peer (P2P) routing between the master storage device and the slave storage device.

9. The storage system of claim 8, wherein the controller hub is further configured to use a protocol according to Peripheral Component Interconnect (PCI) or PCI Express (PCIe).

10. The storage system of claim 1, wherein the master storage device and the slave storage device store the data according to the RAID scheme.

11. The storage system of claim 1, wherein the first function controls the second function and the third function according to the RAID scheme.

12. The storage system of claim 1, wherein the second function and the third function operate to store the data according to the RAID scheme.

13. The storage system of claim 1, wherein the master storage device distributes the command according to a predetermined RAID scheme.

14. The storage system of claim 1, wherein the operation corresponding to the command includes a write operation for storing the data according to the predetermined RAID scheme and
wherein the operation corresponding to the command includes a read operation for reading data according to the predetermined RAID scheme.

15. The storage system of claim 1, the master storage device and the slave storage device operate as a single storage array according to the RAID scheme.

16. The storage system of claim 1, wherein each of the master storage device and the slave storage device directly coupled to the host.

17. The storage system of claim 1, wherein the master storage device and the slave storage device are coupled to the host in parallel.

18. The storage system of claim 2, wherein the first host interface and a physical resource provided by the first function are contained in a single package.

19. The storage system of claim 2, wherein the second host interface and a physical resource provided by the third function are packaged in a single package.

20. The storage system of claim 1, wherein the first function stores the data according to the RAID scheme.

21. The storage system of claim 1, wherein the third function stores the data according to the RAID scheme.

22. The storage system of claim 1, wherein the master storage device includes the module, on which the first non-volatile memory and a first package including the first memory controller are mounted, and the first memory controller includes the first function, the second function, and the first host interface, and
wherein the slave storage device includes a module, on which a second non-volatile memory and a second package including a second memory controller are mounted, and the second memory controller includes the third function and the second host interface.

* * * * *